United States Patent
Patrick

(10) Patent No.: US 9,262,127 B2
(45) Date of Patent: Feb. 16, 2016

(54) SYSTEM AND METHOD FOR AN INFRASTRUCTURE THAT ENABLES PROVISIONING OF DYNAMIC BUSINESS APPLICATIONS

(75) Inventor: Paul Patrick, Morgan Hill, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1580 days.

(21) Appl. No.: 12/207,746

(22) Filed: Sep. 10, 2008

(65) Prior Publication Data

US 2009/0249287 A1  Oct. 1, 2009

Related U.S. Application Data

(60) Provisional application No. 60/971,191, filed on Sep. 10, 2007.

(51) Int. Cl.
*G06F 9/44* (2006.01)
*G06F 17/30* (2006.01)
*G06Q 10/10* (2012.01)
*G06F 11/36* (2006.01)
*G06F 9/455* (2006.01)

(52) U.S. Cl.
CPC .. *G06F 8/24* (2013.01); *G06F 8/20* (2013.01); *G06F 9/455* (2013.01); *G06F 11/36* (2013.01); *G06F 17/30545* (2013.01); *G06F 17/30914* (2013.01); *G06Q 10/10* (2013.01)

(58) Field of Classification Search
CPC ..... G06F 8/20; G06F 11/36; G06F 17/30914; G06F 17/30545; G06F 8/24; G06F 9/455; G06Q 10/10

USPC .................................................. 717/100, 107
See application file for complete search history.

(56) References Cited

U.S. PATENT DOCUMENTS

| | | | |
|---|---|---|---|
| 6,393,605 B1 | 5/2002 | Loomans | |
| 6,523,166 B1 | 2/2003 | Mishra | |
| 6,983,315 B1 | 1/2006 | Crutcher | |
| 7,051,316 B2 | 5/2006 | Charisius | |
| 2003/0144894 A1* | 7/2003 | Robertson | G06Q 10/06 709/226 |
| 2004/0117759 A1* | 6/2004 | Rippert, Jr. | G06F 8/20 717/100 |
| 2005/0108702 A1 | 5/2005 | Baker | |

(Continued)

OTHER PUBLICATIONS

Lazy Loading of Dynamic Dependencies, http:Itdocs.sun.com/apldocsIdoct817-1984/chapter3-7?I=en&a=view&q=lazy, Nov. 27, 2008, 3 pages.*

(Continued)

*Primary Examiner* — Wei Zhen
*Assistant Examiner* — Mohammed Huda
(74) *Attorney, Agent, or Firm* — Tucker Ellis LLP

(57) ABSTRACT

A system and method for providing an infrastructure that can be provisioned for use with dynamic business applications. In accordance with an embodiment, the business application infrastructure comprises a plurality of drop-in components which can be added or provisioned as necessary to create a dynamic business application. For example, an integrated composition environment component can be provisioned to allow end-users to quickly develop business applications from an overall business process perspective. In accordance with other embodiments, the business application infrastructure can incorporate additional components as necessary to better support a particular business application, or a particular execution environment.

20 Claims, 10 Drawing Sheets

(56) References Cited

U.S. PATENT DOCUMENTS

| | | | |
|---|---|---|---|
| 2006/0069717 A1* | 3/2006 | Mamou | G06Q 10/10 709/203 |
| 2006/0112379 A1 | 5/2006 | Chirakansakcharoen | |
| 2006/0140144 A1* | 6/2006 | Bruner | H04L 29/06 370/328 |
| 2006/0271341 A1* | 11/2006 | Brown | G06F 8/20 703/1 |

OTHER PUBLICATIONS

.NET Assemblies, GAC, Versioning, Manifests and Deployment, http://www.thescarms.com/dotnet/Assembly.aspx, Nov. 27, 2008, 5 pages.
BINOD, Lazy Initialization of Application Server Services, http://weblogs.java.net/blog/binod/archive/2005/09/lazy_initializa.html, Nov. 27, 2008, 4 pages.
Apache 1.3 Dynamic Shared Object (Ds0) Support, http://httpd.apache.org/docs/1.3/dso.html, Nov. 27, 2008, 5 pages.
Apache HTTP Server Version 2.0, Apache Module mod_so, http://httpd.apache.org/docs/2.0/mod/mod_so.html, Nov. 27, 2008, 2 pages.
Dynamic Module Deployment, http://livedocs.adobe.com/jrun/4/Assembly_and_Deployment_Guide/deploy3.htm, Nov. 27, 2008, 2 pages.
JRun Features, http://livedocs.adobe.com/jrun/4/Getting_Started_with_JRun/intro5.htm, Nov. 27, 2008, 4 pages.
Geek Explains, http://geekexplains.blogspot.com/2008/06/whats-servlet-preinitialization-lazy.html, Nov. 27, 2008, 4 pages.
Lazy Loading of Dynamic Dependencies, http://docs.sun.com/app/docs/doc/817-1984/chapter3-7?1=en&a=view&q=lazy, Nov. 27, 2008, 3 pages.
Silverlight how to: On-demand Assembly Deployment, http://joel.neubeck.net/2008/03/silverlight-how-to-on-demand-assembly-deployment, Nov. 27, 2008, 4 pages.

* cited by examiner

SYSTEM AND METHOD FOR AN INFRASTRUCTURE THAT ENABLES PROVISIONING OF DYNAMIC BUSINESS APPLICATIONS

CLAIM OF PRIORITY

This application claims the benefit of priority to U.S. Provisional patent application titled "SYSTEM AND METHOD FOR PROVIDING A BUSINESS APPLICATION INFRASTRUCTURE"; Application No. 60/971,191; filed Sep. 10, 2007, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to application server environments, and particularly to a system and method for providing an infrastructure that can be provisioned for use with dynamic business applications.

BACKGROUND

Application servers and application development suites allow a software developer to develop applications, including business processes and Service Oriented Architecture (SOA) applications. However, the application server suite is typically built as a monolithic stack of logical components, and must be fully deployed from the outset with all of the resources that may be needed at a later point in time to support a particular application. This prevents the application server suite from being easily modified to suit different applications, or different execution environments in which an application may be designed to run.

SUMMARY

Disclosed herein is a system and method for providing an infrastructure that can be provisioned for use with business applications. In accordance with an embodiment, the business application infrastructure comprises a plurality of drop-in components which can be added or provisioned as necessary to create a dynamic business application. For example, an integrated composition environment component can be provisioned to allow end-users to quickly develop business applications from an overall business process perspective. In accordance with other embodiments, the business application infrastructure can incorporate additional components as necessary to better support a particular business application, or a particular execution environment.

DETAILED DESCRIPTION

Figure 1:
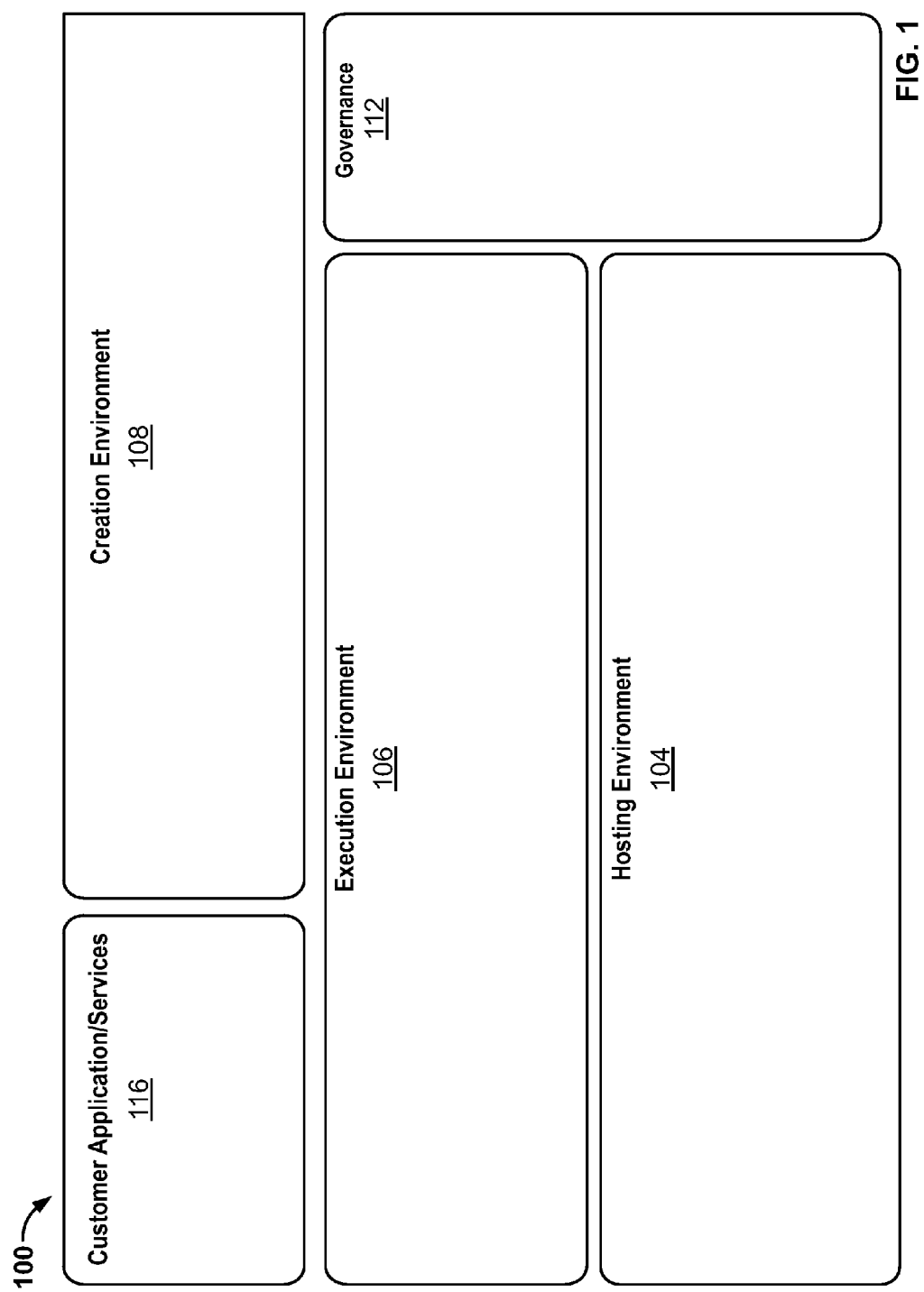
FIG. 1 shows an illustration of a system that embodies a business application infrastructure in accordance with an embodiment.

Disclosed herein is a system and method for providing an infrastructure that can be provisioned for use with dynamic business applications. In accordance with an embodiment, the business application infrastructure comprises a plurality of drop-in components which can be added or provisioned as necessary to create a dynamic business application. For example, an integrated composition environment component can be provisioned to allow end-users to quickly develop business applications from an overall business process perspective. In accordance with other embodiments, the business application infrastructure can incorporate additional components as necessary to better support a particular business application, or a particular execution environment. Components that have been individually developed can be tied together within the business application infrastructure using a "fabric" of interconnectivity. Additional embodiments and modifications are described in further detail below.

Advantages of the business application infrastructure and fabric include that it replaces the monolithic stack of logical components that is normally used in such environments. A fabric-based approach allows components to be weaved together to better address the needs of a particular business application, and to allow greater flexiblity for the application developer. The infrastructure, or a system that embodies or implements the infrastructure, can be deployed or provisioned as different instances, so that in some instances only certain necessary components are provided, while other components that are not important or necessary to that instance need not be provided. The business application infrastructure allows for end users, such as the managers and software developers that use a particular application server or development suite, to quickly build and customize their own business applications, perhaps to reflect the different business needs of different departments or business entities within an organization. In particular the business application infrastructure allows these users to create business-related applications on an ad hoc basis, adapting those application in a dynamic fashion to suit the current business needs of each department or business entity. In this context, the business application infrastructure can be seen as an enterprise-wide infrastructure, together with additional tooling, that can be used to supplement the business and deployment needs of an organization.

In accordance with some embodiments, the system, or the business application infrastructure which it embodies, can be provided as a self-aware or appliance-like component, which in turn can be implemented either as a virtual appliance or as a hardware-based appliance device. When the appliance is initalized, it can look to see what other components are available to it, including data sources, servers, services, and other business processes. It can then provide access to these resources and business processes to the user, to allow them to complete their business application development.

Unlike a typical application server or development suite, which is built as a stack and which necessarily requires that the stack be fully deployed from the outset with all of the resources that are needed to support applications that may be developed in the future, in accordance with an embodiment the business application infrastructure can be provisioned on-demand, together with its environment, to suit a current business need, but to then evolve over time as those business needs change. In accordance with some embodiments the system can incoroprate additional functionality such as social computing, neighborhhoods, and consumer-tagging to provide a more dynamic infrastructure for use in service providing, service consuming, and application development.

Dynamic Business Applications

Business applications are generally created or developed by an organization's business managers, software developers, and other participants, to address the organization's business needs. However, traditional business applications are tied to the existing organizational infrastructure and environment, including its resources and needs. These applications are generally inflexible to being changed when aspects of the organization change. A dynamic business application is a business application that can be changed dynamically for a new target environment, i.e. whenever the organizational infrastructure, resources, or needs change. This may include changes in the business models, policies, or rules of the organization. A dynamic business application provides close alignment with the organization's existing resources, while at the same time provides flexibility to address new business needs. However, this increase in inter-dependencies, combined with the larger scale of today's business, places the infrastructure under new kinds of stress. The collaborative life cycle offered by the dynamic business application also leads to multiple roles, and multiple steps in the business life cycle. Issues such as performance, reliability, and scalability, are of utmost importance to the organization.

In accordance with an embodiment, a dynamic business application can be created by a developer, and then packaged and deployed to the system. During packaging, the application is assembled for use in a target environment. In accordance with an embodiment, the business application infrastructure can use information stored in and advertised by an asset repository to determine which assets may be provided within the environment, which assets and other resources are currently needed by a business application, and which assets are available for use subject to security and other governance considerations. This packaging information is used during deployment to enable the business application infrastructure to provision the components of the business application, or to provision the appropriate containers and other components, services, and assets, that are needed to support that business application in that environment.

In accordance with an embodiment, the asset information is provided by an asset repository that contains metadata about all of the assets within an organization, and the requirements for those assets. Application assembly can be performed somewhat independently of the underlying business application infrastructure. Since the business application infrastructure has the knowledge to determine requirements for each asset, and which asset or resource needs to be included with that application. When the application is deployed, the business application infrastructure looks at the target environment for the application, and ensures that the appropriate resources are provisioned to execute the application, including looking at assets and dependencies. It then deploys those resources as necessary to support the business components that will make up the business application.

For example, the system can use the information provided by an asset repository to determine, e.g. which component is being used by which application, on which machine, and/or which versions of a particular component are compatible with other versions. This ensures that when an application is destined for a particular target environment the components that are packaged and deployed will have complete support in that environment, including that only compatible versions are used. If the system determines a version may not be compatible with a previously deployed component, then it can allow for creating a new hosting enviornment and run the new application version in that new environment.

As described above, the use a business application infrastructure provides support for dynamic business applications on a "use only what you need, when you need it" basis, and allows the business application to be adapted to a new environment as necessary, subject to security and governance considerations as defined in an asset repository or elsewhere in the system. The system can then be provided within an existing infrastructure, or as a virtual or physical appliance, with provisioning of components, as described in further detail below.

Business Application Infrastructure

FIG. 1 shows an illustration of a system that embodies a business application infrastructure in accordance with an embodiment. As shown in FIG. 1, a business application infrastructure 100 comprises a variety of different environments, such as a creation environment 108, execution environment 106, and/or hosting environment 104. The business application infrastructure is also used by or includes an organization's application services 116. A governance environment 112 ensures security, governance and management over the various assets, components and resources which the business application infrastructure provides. FIG. 1 shows a generalized overview of a possible infrastructure instance. As described in further detail below, some or all of the components shown in FIG. 1 may be used for a particular instance, depending on the needs of the business application, and the available assets and resources in the organization's target environment. Components that are not necessary need not be provisioned for that application.

Figure 2:
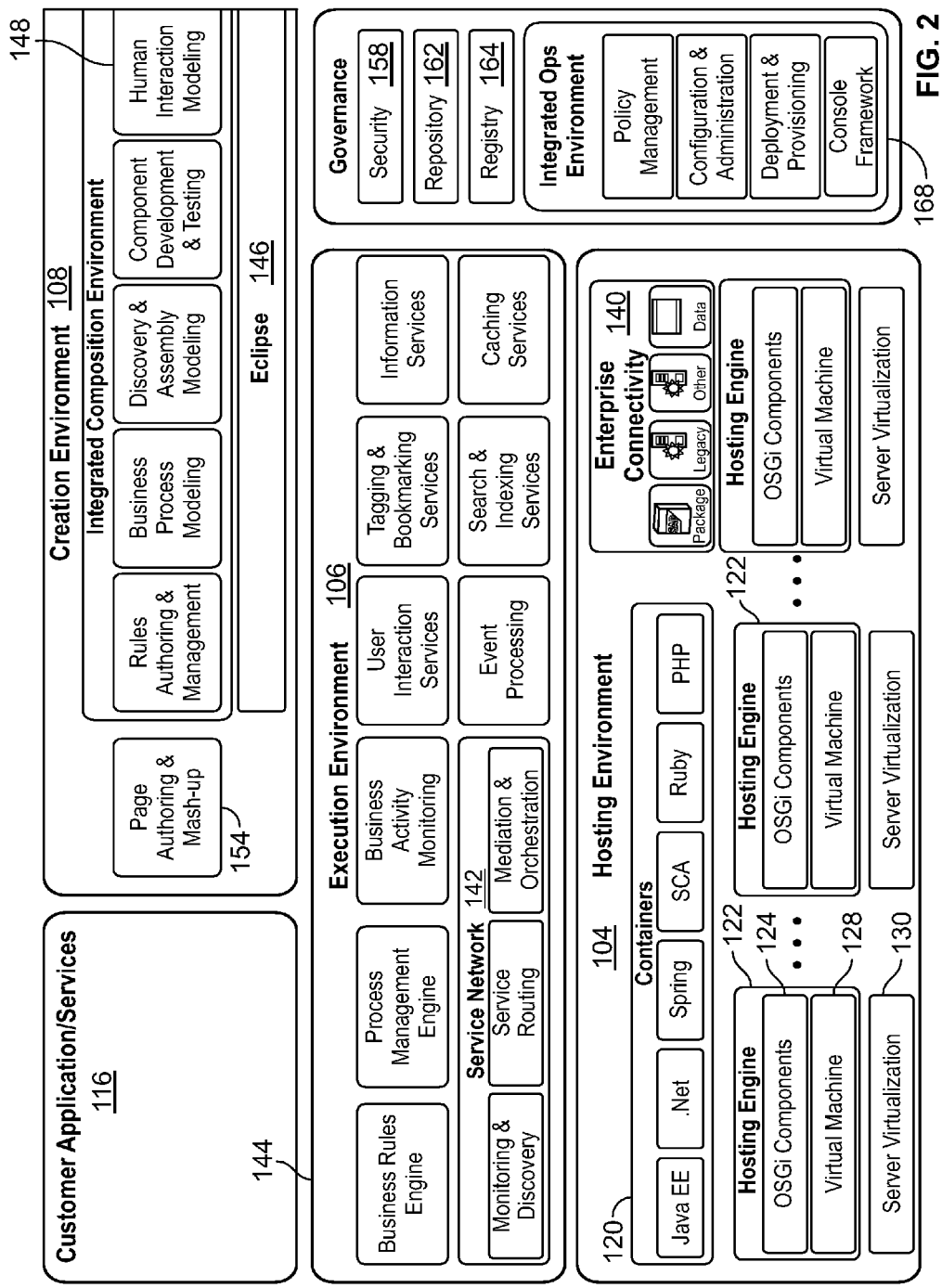
FIG. 2 shows another illustration of a system in accordance with an embodiment, including an example of the components that can be provisioned to support different environments.

FIG. 2 shows another illustration of a system in accordance with an embodiment, including an example of the components that can be provisioned to support different environments. As shown in FIG. 2, and depending on the needs of the business application, a creation environment 108 can comprise an integrated composition environment (ICE) 148, which in some instances can be installed on an interface platform such as Eclipse 146, and allows the software developer or another user to develop applications. A Page Authoring & Mash-up component 154 can also be included to assist in this regard. In the example instance shown in FIG. 2, the integrated composition environment can also comprise components such as: Rules Authoring & Management; Business Process Modeling; Discovery & Assembly Modeling; Component Development & Testing; and Human Interaction Modeling.

As further shown in FIG. 2, in accordance with an embodiment, and depending on the needs of the business application, the execution environment 106 can in some instances comprise a service network 142, an example of which is described in copending application titled "SYSTEM AND METHOD FOR SUPPORTING SERVICE NETWORKS IN A SERVICE-ORIENTED ARCHITECTURE ENVIRONMENT"; application Ser. No. 11/857,988; filed Sep. 19, 2007; and copending application titled "SERVICE ROUTER FOR USE WITH A SERVICE-ORIENTED ARCHITECTURE ENVIRONMENT"; application Ser. No. 11/857,994; filed Sep. 19, 2007; both of which applications are herein incorporated by reference. The service network provides service monitoring and discovery, service routing, and mediation and orchestration. The execution environment can comprise various other components such as a Business Rules Engine; Process Management Engine; Business Activity Monitoring; User Interaction Services; Tagging & Bookmarking Services; Information Services; Service Network; Event Processing; Search & Indexing Services; and Caching Services.

As further shown in FIG. 2, and depending on the needs of the business application, the hosting environment 104 can in some instances comprise one or a plurality of hosting engines 122, which behave similar to operating system (O/S) engines. Depending on the particular instance, each of these engines can optionally utilize one or more micro-services architecture, OSGi components 124 per the micro-services architecture, a virtual machine 128, and/or a virtualization layer 130 such as, for example, a hypervisor. Other embodiments and instances may not have a need for a virtualization layer. In some embodiments the hosting engine can host one or more containers, which in turn can be either Java or non-Java containers, and which can be deployed as needed, so that only those containers that are needed for a particular application need to be installed into the hosting environment. Other containers can be deployed later as necessary. In accordance with an embodiment the hosting environment 104 can include a plurality of containers 120, including Java and non-Java containers, such as a Java EE container; a .Net container; Spring container; SCA container; Ruby container; and PHP container; and other enterprise connectivity features 140 for packaging and/or connecting to legacy applications.

As further shown in FIG. 2, and depending on the needs of the business application, the governance environment can comprise various components and features, such as a Security component 158; a Repository 162; a Registry 164; and/or an Integrated Operations Environment 168 which handles policy management, configuration and administration, deployment and provisioning, and a console framework.

In accordance with an embodiment, asset discovery can be used to automatically populate the asset repository with assets that are detected within a particular environment. The governance component can then apply security, rules, access rights and policies that control the proper use and availability of those assets. Governance can also control backward compatibility between the applications being developed over time, and the resources and services that those applications will use. A packager can be used during deployment to package the application particularly for its environment. Since the business application infrastructure knows each of the assets within its environments, it can determine which resources the application currently needs, and then provision the appropriate containers to support that application. This allows the business application infrastructure to be provisioned quickly, and with the necessary components, for a particular business process or a particular need within the enterprise.

A feature of such provisioning is that the business application infrastructure need only provision those containers and components that are necessary. If a particular container is not needed, then the system need not provision that container. This allows the hosting environment to be made more lightweight than traditional stack-oriented application server systems. In accordance with some embodiments the hosting engine may not need a user interface, and so the infrastructure will not provision a user interface component. Similarly, with some embodiments a virtualization layer may not be needed, so the infrastructure will not provision any virtualization components. The business application infrastructure can add features such as a hosting engine and additional containers or components as needed to create different configurations and to suit different target environments and business applications. For example, a developer may choose to deploy an EJB on a hosting engine, and then put that instance of the business application infrastructure close to a database to tightly couple the application server environment with the database.

The following examples illustrate other ways of using the business application infrastructure:

A hosting engine component, plus an event processing component, can be used to create an event server.

A hosting engine component, plus a set of J2EE container components, can be used to create a Java application server.

A hosting engine component, plus a process management engine, can be used to create a business process server.

Figure 3:
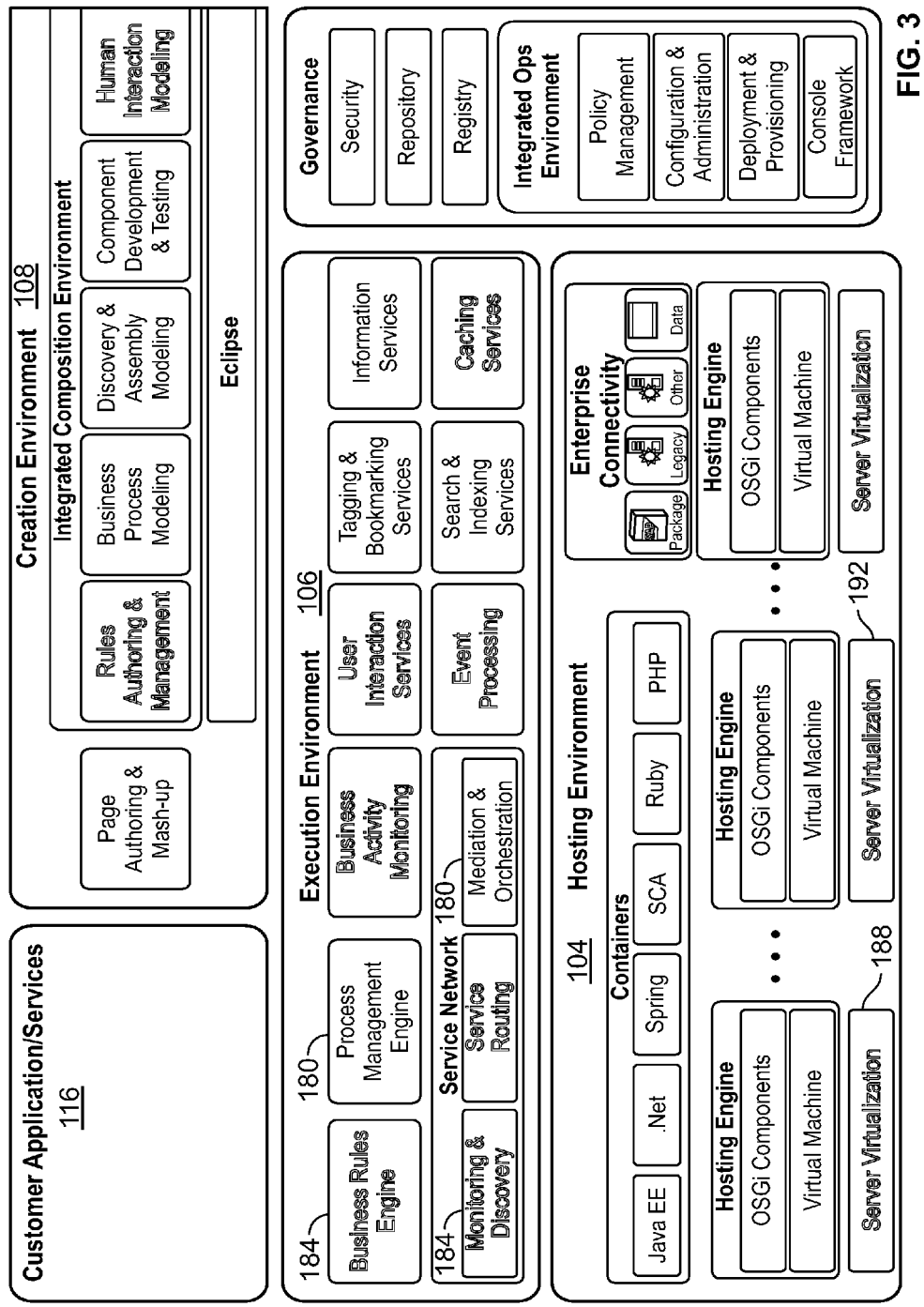
FIG. 3 shows another illustration of a system in accordance with an embodiment, which shows how certain components can be selected and used for a particular environment.

FIG. 3 shows another illustration of a system in accordance with an embodiment, which shows how certain components can be selected and used for a particular environment. In accordance with some embodiments, the application can be provided as an appliance, such as a hardare appliance, that can be used to easily and quickly extend the enterprise from a SOA application perspective, much as a home router can be used to extend the Internet to a persons home. In some embodiments, the business application infrastructure can be dropped-in and start discovering and provisioning the environment to best suit that particular application environment and application needs. As shown in FIG. 3, a selection or some of the components 180, 192 in the business application infrastructure, (illustrated with solid lines) are utilized in the appliance, while other components 184, 188 in the business application infrastructure, (illustrated with ghosted or patterned lines) are not utilized in the appliance. As described above, the business application infrastructure need only provision containers and components as necessary. If a particular container is not needed, then the system need not provision that container, which allows the hosting environment to be much more lightweight than traditional stack-oriented application server systems.

Figure 4:
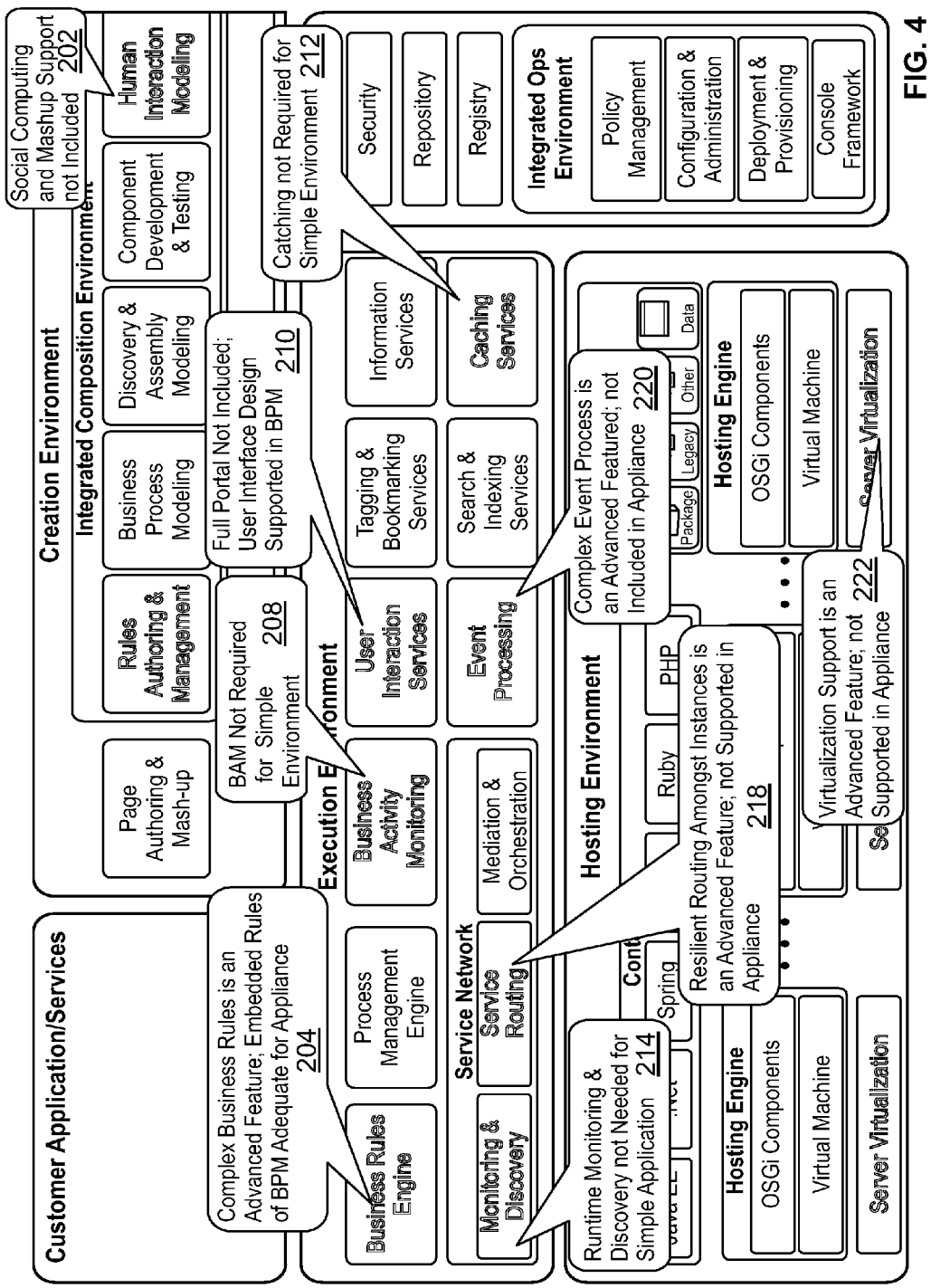
FIG. 4 shows another illustration of a system in accordance with an embodiment which shows how certain components can be selected and used for a particular environment.

FIG. 4 shows another illustration of a system in accordance with an embodiment which shows how certain components can be selected and used for a particular environment. As shown in FIG. 4, in accordance with some embodiments 200, that allow the application to be provided as an appliance, social computing and mashup support may be omitted or not provisioned 202, which allows the business application infrastructure to similarly omit or not provision the human interaction component. Complex business rules are an advanced feature, so that the embedded rules are probably adequate for an appliance 204, which allows the business rules engine component to be omitted. Since Business Activity Monitoring is not required for a simple environment 208, the business application infrastructure can omit the BAM component. A full portal need not be included in the application, since user interface design can be supported in BPM 210, which allows the user interaction services component to be omitted. Caching is not required for a simple environment 212, which allows the caching services component to be omitted. Runtime monitoring and discovery is similarly not needed for a simple application 214, which allows the monitoring and discovery component to be omitted. Resilient routing amongst instances is an advanced feature not supported in an appliance 218, which allows the service routing component to be omitted. Similarly, complex event processing is an advance feature not supported in an appliance 220, which allows the event processing component to be omitted. Finally in this example, virtualization support is another advanced feature not supported in an appliance 222, which allows the business application infrastructure to omit vthe irtualization component.

It will be evident that the above example of an appliance is just one example of an environment in which the business application infrastructure can be provisioned, and that in other environments and other examples, the business application infrastructure can be provisioned differently, with or without different components, to suit a particular business process or a particular need within the enterprise.

Fabric-Based Approach to Business Application Infrastructure

As described above a fabric-based approach to providing a business application infrasturucte allows the components to be weaved together to better address the needs of a particular business application, and to allow greater flexiblity for the application developer. A system that embodies or implements the infrastructure can be deployed or provisioned as different instances so that only certain necessary components are provisioned. The following sections describe in further detail how such a fabric-based infrastructure can be implemented.

Figure 5:
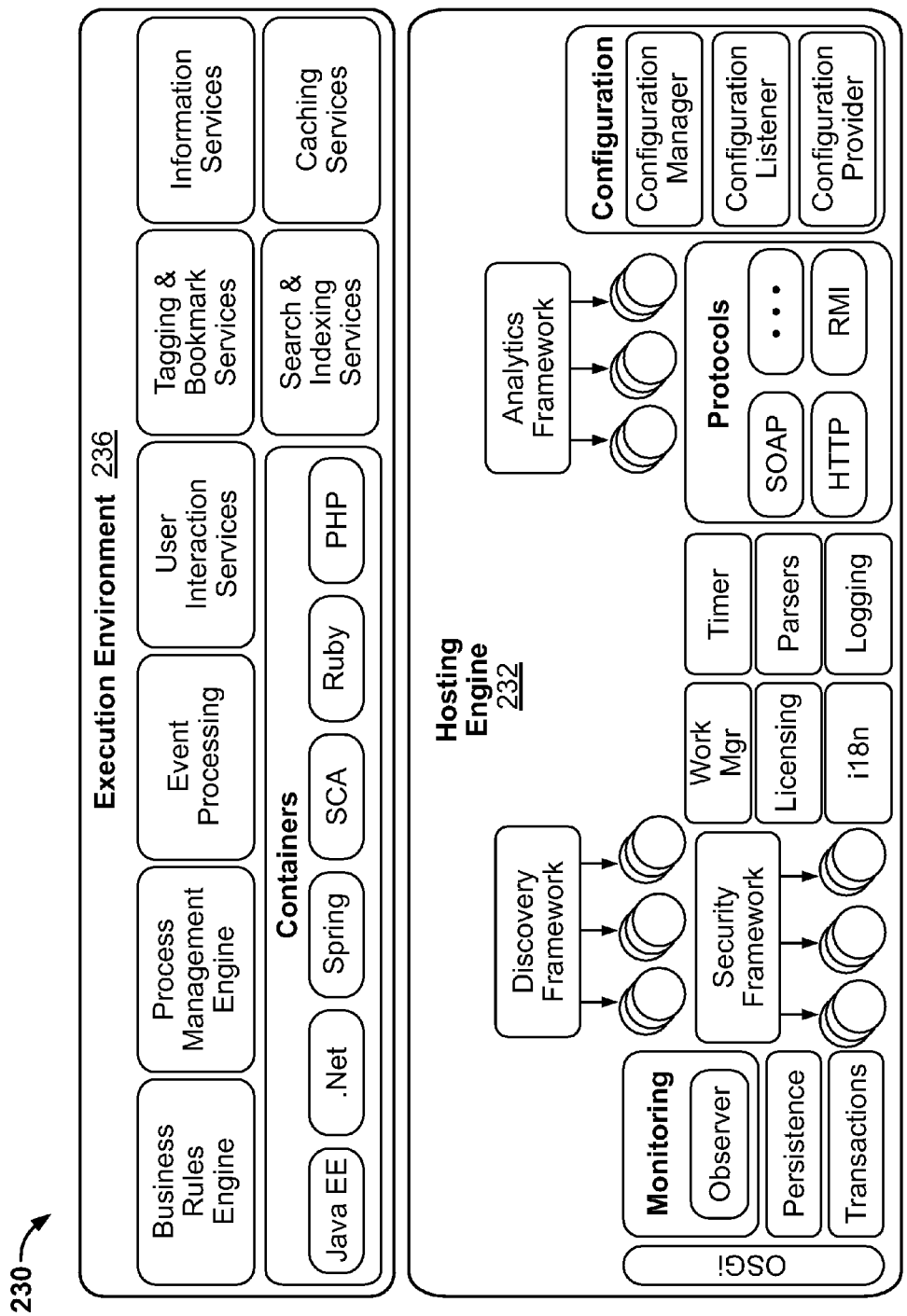
FIG. 5 shows an illustration of an embodiment that can be used to provide a business application infrastructure.

FIG. 5 shows an illustration of an embodiment that can be used to provide a business application infrastructure. As shown in FIG. 5, an instance of the application environment 230 can include multiple layers, in this instance a hosting engine layer 232 and an execution environment layer 236. Each of these layers can optionally include one or more optional components, such as a discovery framework, OSGi, an analytics framework, or a security framework.

Figure 6:
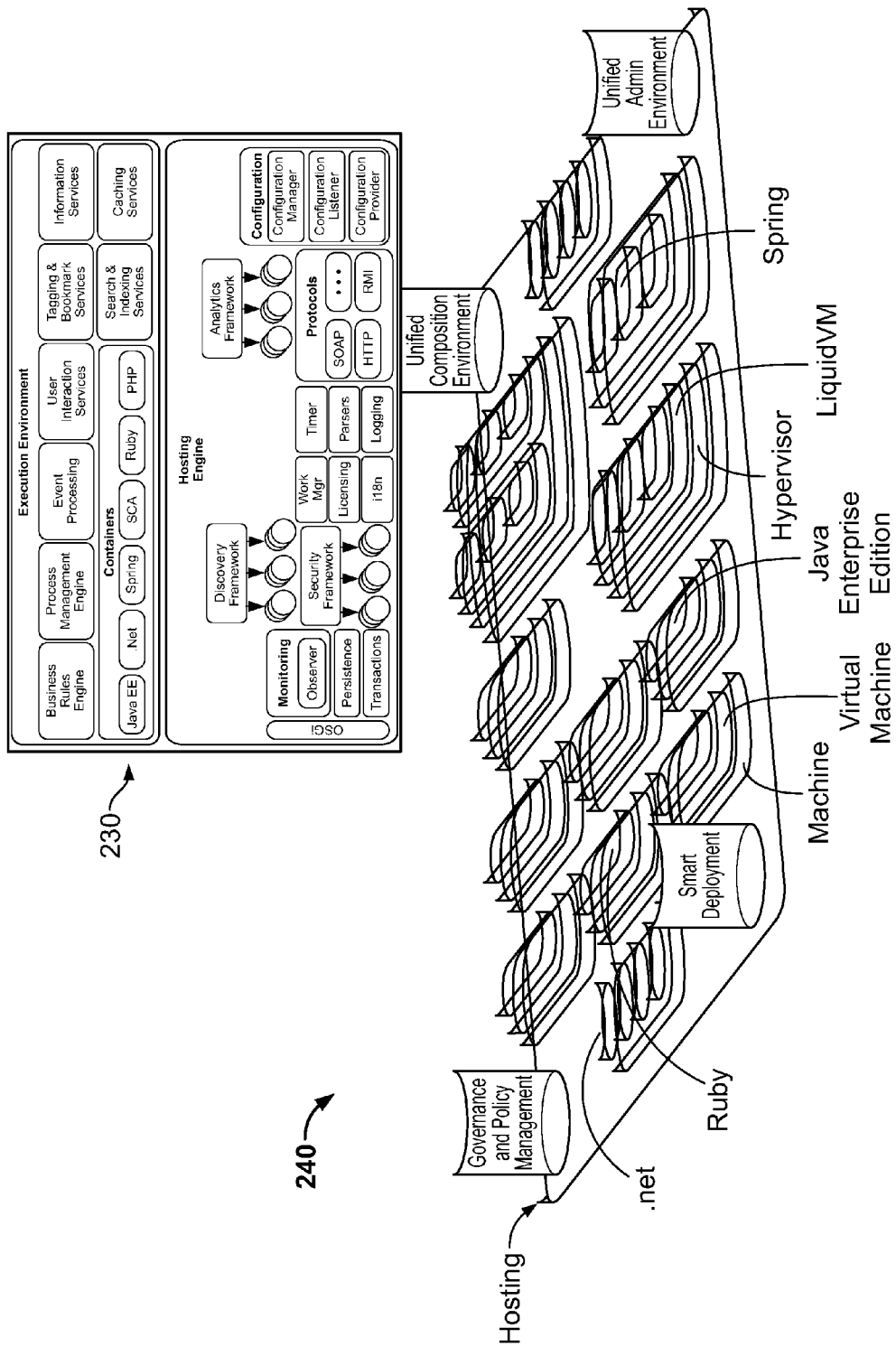
FIG. 6 shows another illustration of an embodiment that can be used to provide a business application infrastructure.

FIG. 6 shows another illustration of an embodiment that can be used to provide a business application infrastructure. The dynamic nature of dynamic business applications requires a new approach to providing the underlying infrastructure. As shown in FIG. 6, the infrastructure shown in FIG. 5 acts as a hosting layer 240 that can be shaped and configured to meet the needs of an enterprise organization. Like a fabric, this layer can be deployed either with or independent of another layer. The importance of layering becomes apparent when the various layers are used together or as a foundation for dynamic business applications, in that components can be shared between different layers. In accordance with an embodiment, each hosting engine can be built from the core elements that make up WebLogic Server or another application server. The hosting layer can be based on a microServices Architecture and components can be assembled to create new offerings that provide a "just enough" application server.

Figure 7:
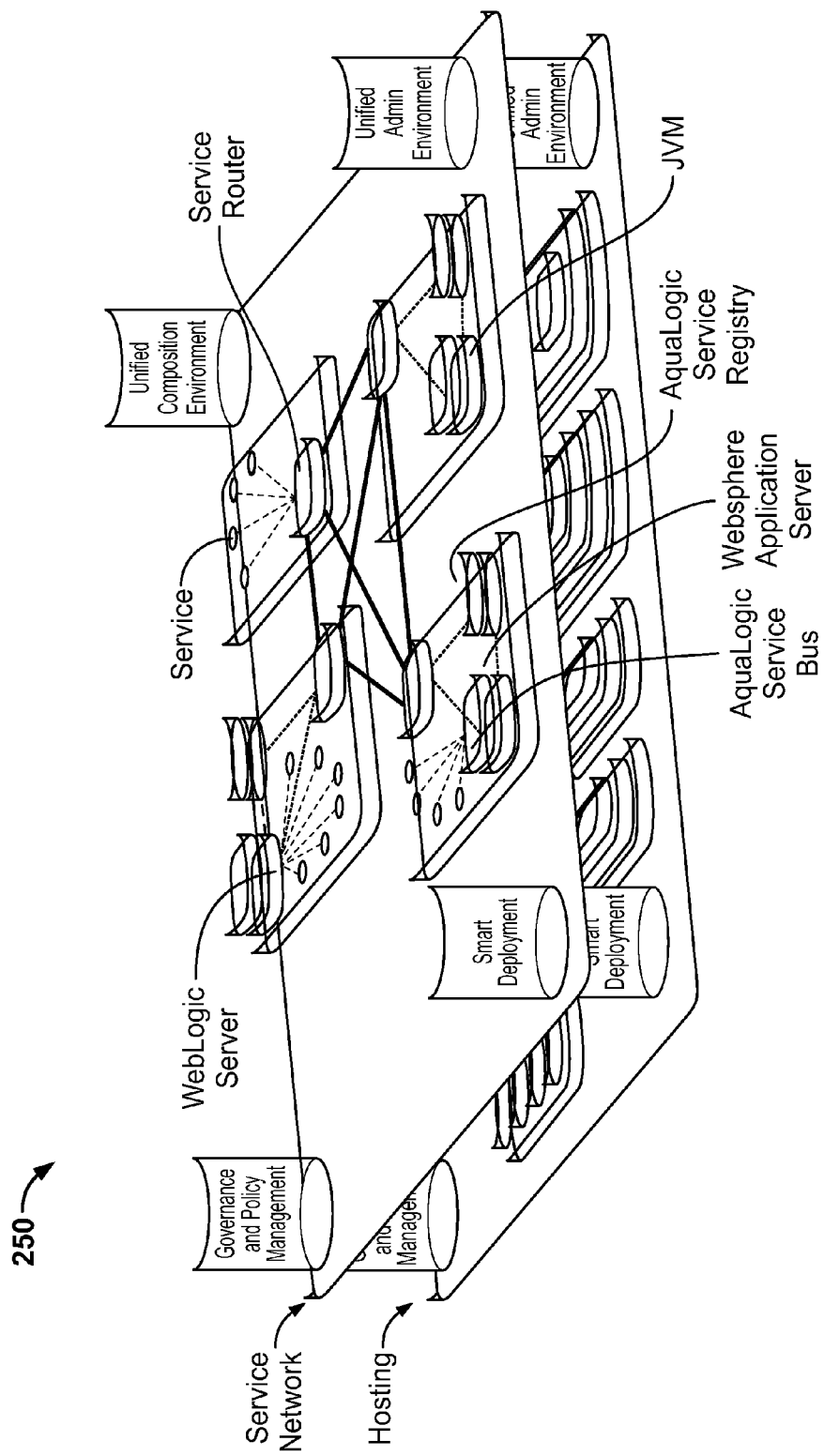
FIG. 7 shows another illustration of an embodiment that can be used to provide a business application infrastructure.

FIG. 7 shows another illustration of an embodiment that can be used to provide a business application infrastructure. Enterprise environments are generally very heterogeneous, and not every service within one of these heterogeneous compartments should necessarily be a shared business service. Business applications have also become increasingly complex due to highly distributed infrastructure and the rise of SOA. Reliability is also of great importance in providing such a service infrastructure. As shown in FIG. 7, in accordance with an embodiment, a service network layer 250 can be layered over the hosting layer. The service network, an example of which is described in copending application titled "SYSTEM AND METHOD FOR SUPPORTING SERVICE NETWORKS IN A SERVICE-ORIENTED ARCHITECTURE ENVIRONMENT"; application Ser. No. 11/857,988; filed Sep. 19, 2007; and copending application titled "SERVICE ROUTER FOR USE WITH A SERVICE-ORIENTED ARCHITECTURE ENVIRONMENT"; application Ser. No. 11/857,994; filed Sep. 19, 2007; supports features such as federation and routing amongst the different compartments in a resilient manner that is based on the core principles behind the Internet itself. Service neighborhoods can be mapped upon the compartmental structure of an enterprise and provide resiliency of messages between the different neighborhoods. The service network can also provide functionality such as dynamic discovery and knowledge of adjacent service routers, a continuously updated view of the service network, transparency, dynamic binding to business services throughout the network without requiring developers to change code or operations to manually update routing tables and the ability to dynamically publish binding information about shared business services in other service neighborhoods in popular service publication sources such as UDDI and others.

Figure 8:
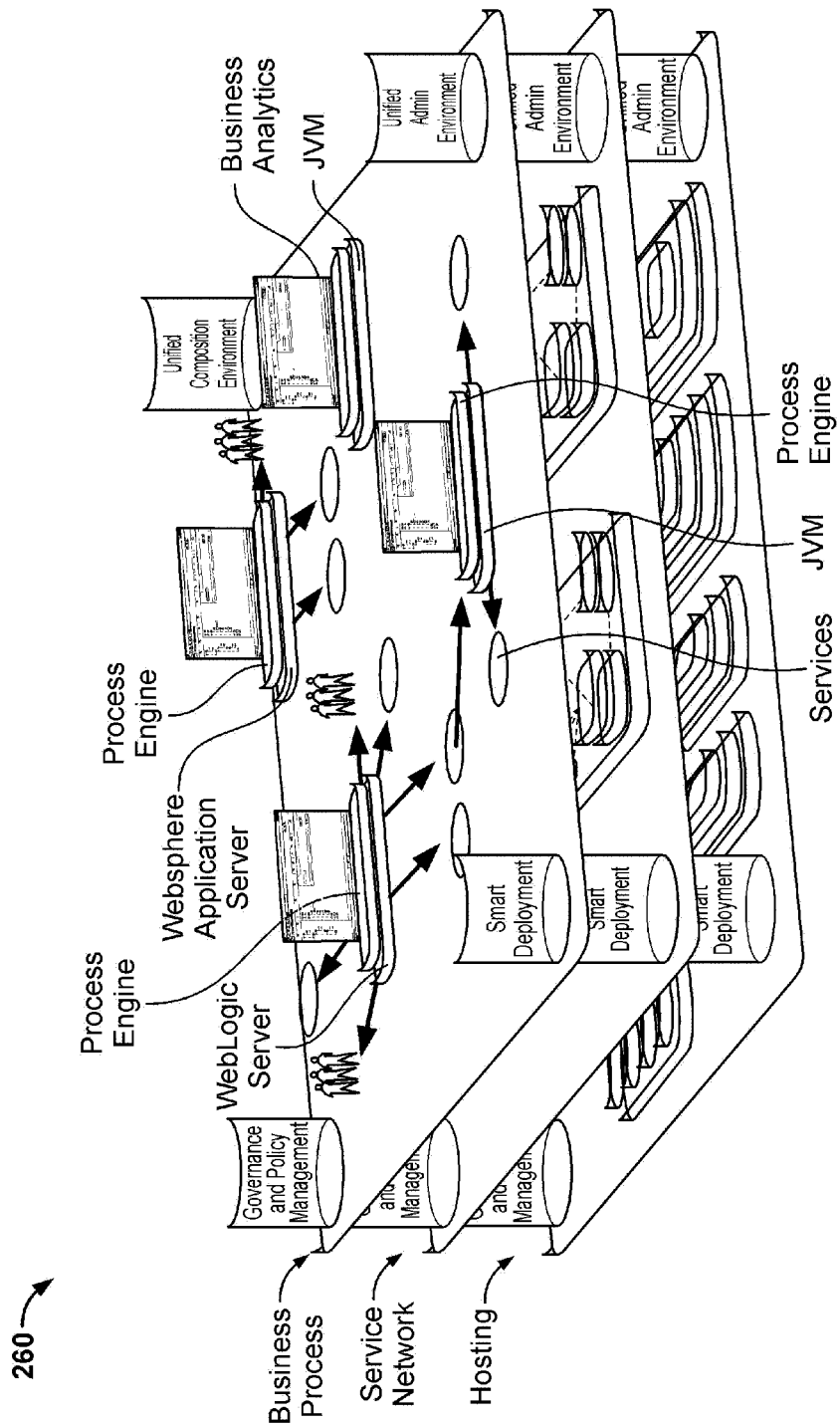
FIG. 8 shows another illustration of an embodiment that can be used to provide a business application infrastructure.

FIG. 8 shows another illustration of an embodiment that can be used to provide a business application infrastructure. As shown in FIG. 8, in accordance with an embodiment, a business process layer 260 can be layered over the service network layer and the hosting layer. The business process layer focuses on real-time business needs, such as allowing business processes to be leveraged by Rich Internet Applications & mashups, enabling customers to take control & ownership of business processes.

Figure 9:
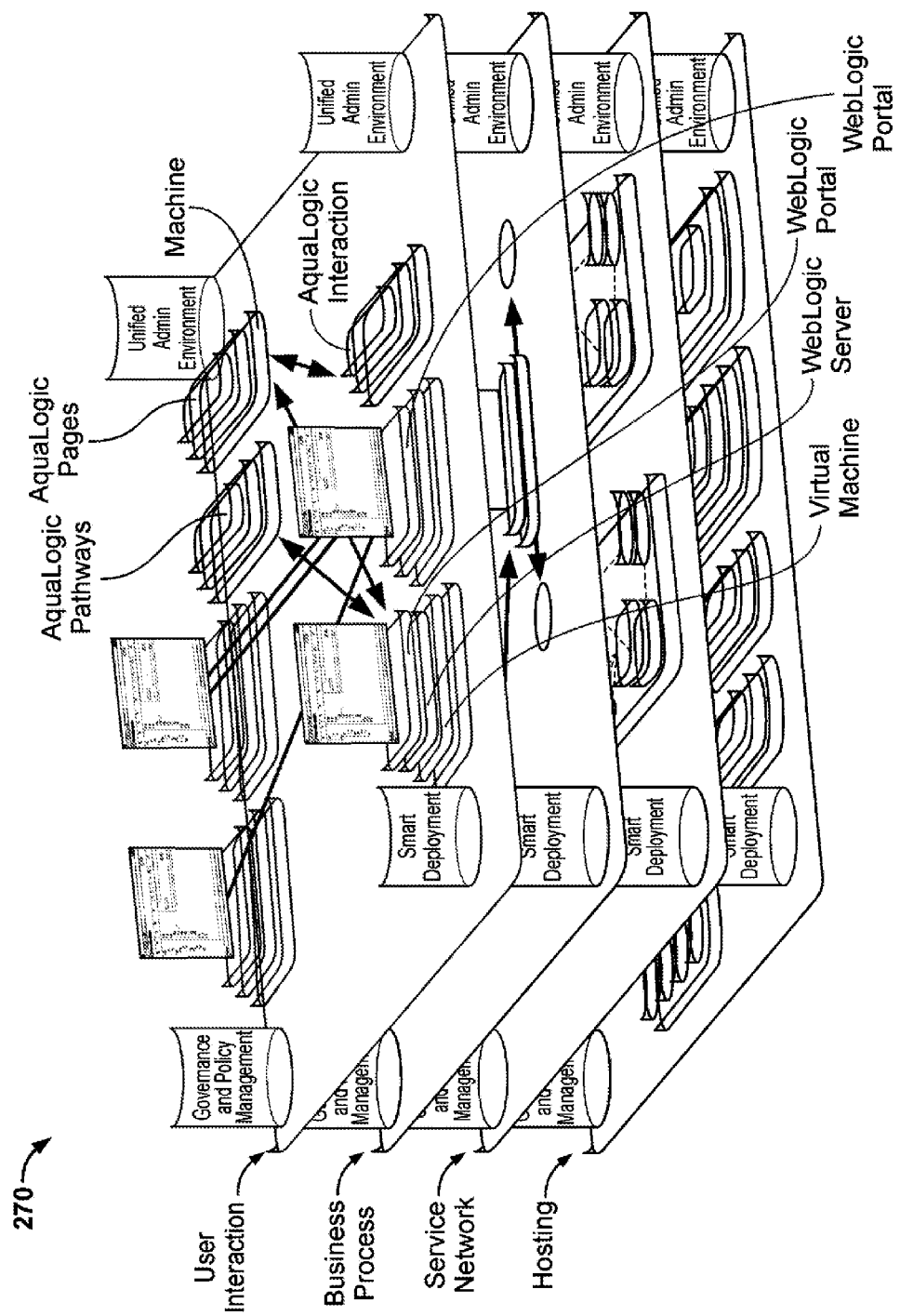
FIG. 9 shows another illustration of an embodiment that can be used to provide a business application infrastructure.

FIG. 9 shows another illustration of an embodiment that can be used to provide a business application infrastructure. As shown in FIG. 9, in accordance with an embodiment, a user interaction layer 270 can be layered over the business process layer, service network layer, and hosting layer. The user interaction layer focuses on the end users' experience, including features such as a dynamic user interface environment, Web2.0, AJAX, FLEX, Wikis, Blogs, RSS, Social Networking, and Search Ranking. The user interaction layer focuses on leveraging skills, knowledge & experience to improve process, decision making & productivity. A user can create their own applications (including use of mashups), and leverage SOA by reusing enterprise services, processes and external services.

As described above, each of the layers and the components can be provisioned to suit a particular business application environment. Layers and components can also be omitted as necessary for particular environments or applications. For example, in some instances the service network layer can be used without a hosting layer, since the service network can itself provide an infrastructure for dynamic business applications to communicate with one another. Similarly, a workflow process engine can be created without a service network layer or hosting layer. It will also be evident that the layers do not need to be placed one on top of the other in an isolated fashion, but instead can logically operate in such a way that the lower layer components can be utilized by the upper later components, and vice versa.

As further shown in FIG. 9, in accordance with an embodiment some of the components logically run throughout several or all of the layers. For example, the governance component, which as described above ensures that security, governance and management is provided over the various assets, components and resources provided by the business application infrastructure provides, is best suited to span some or all of the layers in the infrastructure. Similarly, deployment functionality composition functionality and unified administrative environment components are also better suited to spanning some or all of the layers of the dynamic business infrastructure so that they can be used with each component and in each layer.

Figure 10:
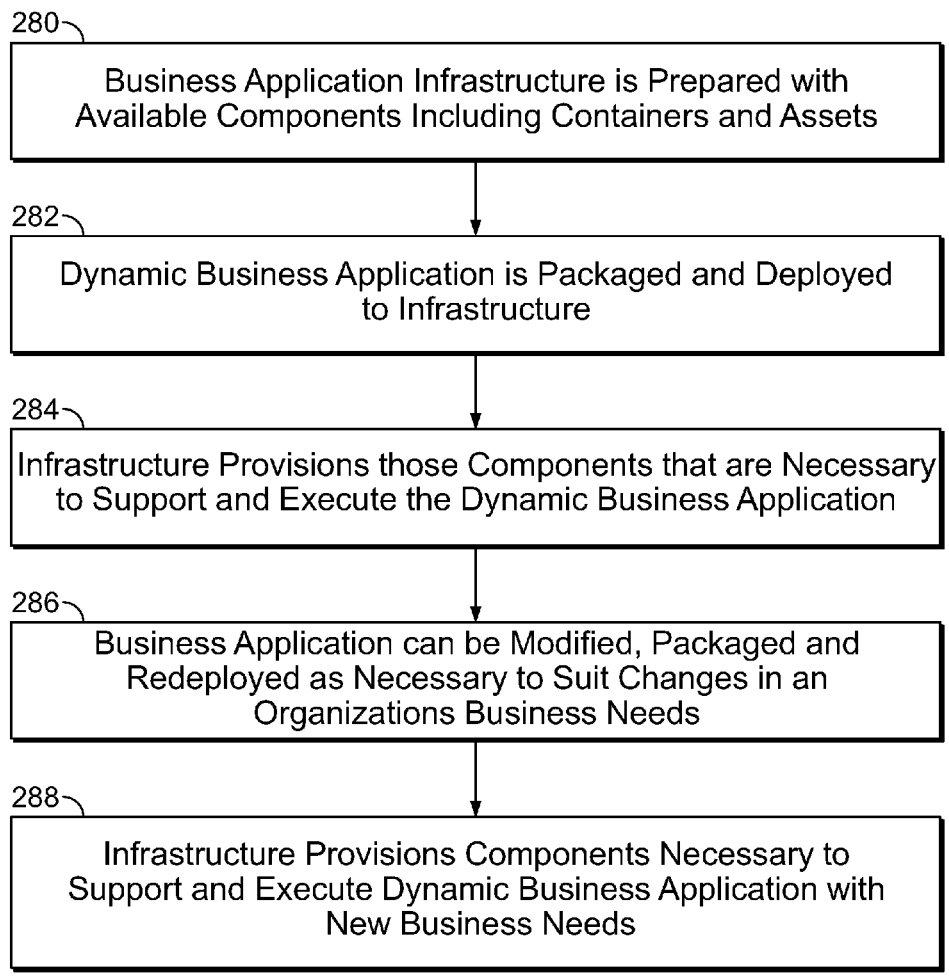
FIG. 10 shows a flowchart of a process to provide a business application infrastructure in accordance with an embodiment.

FIG. 10 shows a flowchart of a process to provide a business application infrastructure in accordance with an embodiment. As shown in FIG. 10, in step 280, the business application infrastructure is prepared with available components, including containers and assets. In step 282, a dynamic business application is packaged and deployed to the infrastructure. In step 284, the infrastructure provisions those components that are necessary to support and execute the dynamic business application. In step 286, the business application can be modified, packaged and redeployed as necessary to suit changes in an organization's business needs. In step 290, the infrastructure provisions components necessary to support and execute a dynamic business application with new business needs.

The present invention can be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features can be used in a WebLogic or AquaLogic environment, other application servers, computer systems, and environments may use and benefit from the invention. The code examples given are presented for purposes of illustration. It will be evident that the techniques described herein can be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing a dynamic application server environment for hosting dynamic applications, comprising:
a computer including a microprocessor;
a dynamic application packaged for deployment to a particular environment that executes on the computer and provides required assets for hosting or executing the dynamic application, wherein the required assets include a particular virtualization component, a particular application container, and a particular service;
a business application infrastructure that includes
a hosting layer including one or more hosting engines, wherein the particular virtualization component and the particular application container are to be installed,
an execution layer, wherein the particular service is to be installed, and a governance component which includes
an asset repository that stores metadata for a plurality of assets for use by the business application infrastructure, wherein the metadata is generated and populated into the asset repository by a service network that automatically detects the plurality of assets on a plurality of machines within a particular network, and
security rules and policies controlling use and availability of the plurality of assets;
wherein the system operates to
determine a location of each of the required asset using the metadata in the asset repository,
determine the availability of each required asset in accordance with the security rules and policies in the governance component,
provision, from the asset repository, each required asset in the hosting and execution layers of the business application infrastructure,
remove, from the hosting or the execution layer, one or more assets that are not required by the dynamic application, and
deploy the dynamic application to the business application infrastructure.

2. The system of claim 1, further comprising:
a creation environment, including a plurality of tools for use in creating the dynamic application deployed to the business application infrastructure, wherein the plurality of tools are installed into the creation environment as needed.

3. The system of claim 1, wherein the system uses the metadata to determine that the dynamic application is incompatible with a previously deployed asset in the target environment, and create a new target environment for hosting and executing the dynamic application.

4. The system of claim 1, wherein the hosting layer does not include the particular application container or the virtualization component before the system provisions the application container and the virtualization component in the hosting layer, and wherein the application container provides a particular environment for running the dynamic application.

5. The system of claim 1, wherein the service network provides service monitoring to the plurality of assets.

6. A method for providing a dynamic application server environment for hosting dynamic applications, comprising:
providing a dynamic application packaged for deployment to a particular environment that provides required assets for hosting or executing the dynamic application, wherein the required assets include a particular virtualization component, a particular application container, and a particular service;
providing, on one or more microprocessors, a business application infrastructure that includes a hosting layer including one or more hosting engines, wherein the particular virtualization component and the particular application container are to be installed,
an execution layer, wherein the particular service is to be installed, and
a governance component which includes
an asset repository that stores metadata for a plurality of assets for use by the business application infrastructure, wherein the metadata is generated and populated into the asset repository by a service network that automatically detects the plurality of assets on a plurality of machines within a particular network, and
security rules and policies controlling use and availability of the plurality of assets;
determining a location of each of the required asset using the metadata in the asset repository;
determining the availability of each required asset in accordance with the security rules and policies in the governance component;
provisioning, from the asset repository, each required asset in the hosting and execution layers of the business application infrastructure;
removing, from the hosting or the execution layer, one or more assets that are not required by the dynamic application; and
deploying the dynamic application to the business application infrastructure.

7. The method of claim 6, wherein the system further includes a plurality of tools for use in creating the dynamic, wherein the plurality of tools are installed into a creation environment as needed.

8. The method of claim 6, wherein the metadata is used to determine that the dynamic application is incompatible with a previously deployed asset in the target environment, and create a new target environment for hosting and executing the dynamic application.

9. The method of claim 6, wherein the hosting layer does not include the particular application container or the virtualization component before the system provisions the application container and the virtualization component in the hosting layer, and wherein the application container provides a particular environment for running the dynamic application.

10. The method of claim 6, wherein the service network provides service monitoring to the plurality of assets.

11. A non-transitory computer readable storage medium, including computer readable instructions stored thereon for providing a dynamic application server environment for hosting dynamic applications, which when read and executed by a computer, cause the computer to perform the steps comprising:
packaging a dynamic application for deployment to a particular environment that provides required assets for hosting or executing the dynamic application, wherein the required assets include a particular virtualization component, a particular application container, and a particular service;
configuring, on one or more microprocessors, a business application infrastructure that includes
a hosting layer including one or more hosting engines, wherein the particular virtualization component and the particular application container are to be installed,
an execution layer, wherein the particular service is to be installed, and
a governance component which includes
an asset repository that stores metadata for a plurality of assets for use by the business application infrastructure, wherein the metadata is generated and populated into the asset repository by a service network that automatically detects the plurality of assets on a plurality of machines within a particular network, and
security rules and policies controlling use and availability of the plurality of assets;
determining a location of each of the required asset using the metadata in the asset repository;
determining the availability of each required asset in accordance with the security rules and policies in the governance component;
provisioning, from the asset repository, each required asset in the hosting and execution layers of the business application infrastructure;
removing, from the hosting or the execution layer, one or more assets that are not required by the dynamic application; and
deploying the dynamic application to the business application infrastructure.

12. The non-transitory computer readable storage medium of claim 11, wherein the system further includes a plurality of tools for use in creating the dynamic application, wherein the plurality of tools are installed into a creation environment as needed.

13. The non-transitory computer readable storage medium of claim 11, wherein the metadata is used to determine that the dynamic application is incompatible with a previously deployed asset in the target environment, and create a new target environment for hosting and executing the dynamic application.

14. The non-transitory computer readable storage medium of claim 11, wherein the hosting layer does not include the particular application container or the virtualization component before the system provisions the application container and the virtualization component in the hosting layer, and wherein the application container provides a particular environment for running the dynamic application.

15. The non-transitory computer readable storage medium of claim 11, wherein the service network provides service monitoring to the plurality of assets.

16. The system of claim 1, wherein the target environment of the dynamic application includes a plurality of enterprise connectivity features which enable connecting to legacy applications.

17. The system of claim 1, wherein the governance component further comprises an integrated operations environment which handles policy management, configuration and administration, deployment and provisioning, and a console framework.

18. The method of claim 6, wherein the target environment of the dynamic application includes a plurality of enterprise connectivity features which enable connecting to legacy applications.

19. The method of claim 6, wherein the governance component further comprises an integrated operations environment which handles policy management, configuration and administration, deployment and provisioning, and a console framework.

20. The non-transitory computer readable storage medium of claim 11, wherein the governance component further comprises an integrated operations environment which handles policy management, configuration and administration, deployment and provisioning, and a console framework.

* * * * *